No. 840,882. PATENTED JAN. 8, 1907.
S. UPTON.
FRICTION CLUTCH.
APPLICATION FILED AUG. 1, 1904. RENEWED DEC. 18, 1905.
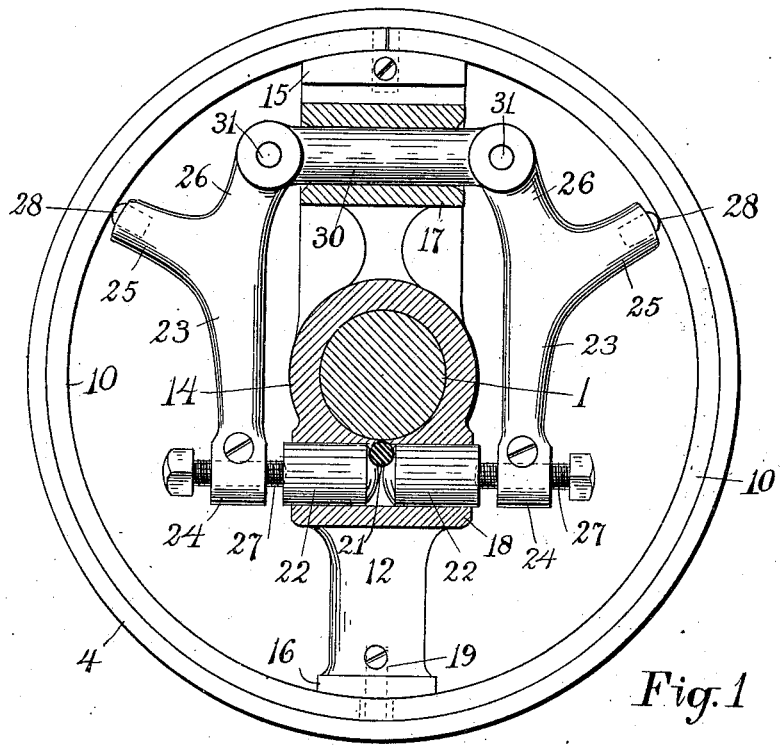
*Fig. 1*
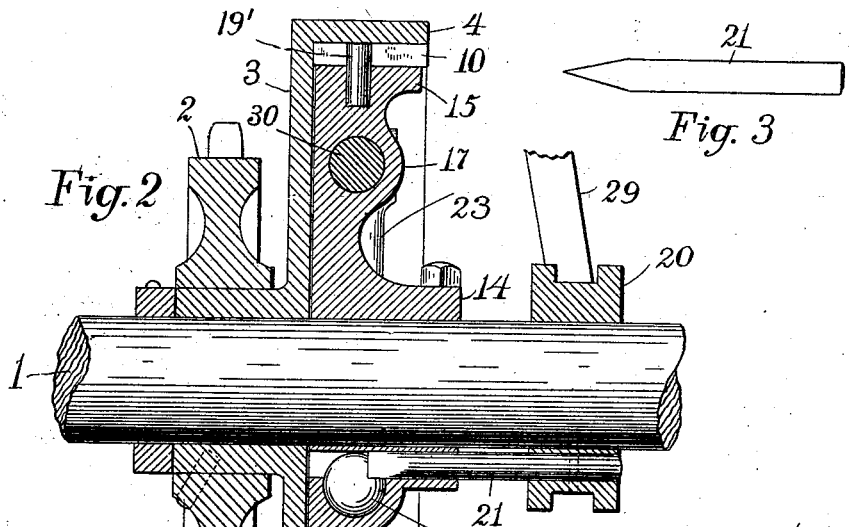
*Fig. 2*
*Fig. 3*
Witnesses;
Inventor,
Samuel Upton;
His Attorney.

UNITED STATES PATENT OFFICE.

SAMUEL UPTON, OF SOMERVILLE, MASSACHUSETTS.

FRICTION-CLUTCH.

No. 840,882.

Specification of Letters Patent.

Patented Jan. 8, 1907.

Application filed August 1, 1904. Renewed December 18, 1905. Serial No. 292,271.

*To all whom it may concern:*

Be it known that I, SAMUEL UPTON, a citizen of the United States, and a resident of the city of Somerville, county of Middlesex, State of Massachusetts, have invented certain new and useful Improvements in Friction-Clutches, of which the following is a full, clear, and exact description.

This invention is primarily designed for use upon automobiles in the transmission of power from the engines to the driving-wheels, although it is well adapted for other purposes where the power remains substantially constant, but its use is variable.

My invention has for its object the effecting of the improvements hereinafter set forth.

Referring to the drawings forming part of this specification, Figure 1 is a face view of the clutch embodying my invention, showing the shaft in transverse section and also certain of the parts of the clutch mechanism. Fig. 2 is a central section of the clutch parallel with the shaft. Fig. 3 shows the wedge-pin in plan.

The shaft 1, to which this clutch mechanism is applied, is supposed to be in substantially continuous rotation and to be designed for the transmission of power at will therefrom by any suitable means, as the sprocket-wheel 2. (Shown in Fig. 2.) Said sprocket-wheel is loose upon the shaft, but is rigid with the disk 3, upon whose hub it is shown as fixed. This disk is formed with a cylindrical flange or rim 4, which is designed to contact with the annular shoe 10 within it. Fixed to the shaft is the diametrical arm 12, the ends 15 and 16 of which terminate close to the inner surface of said shoe or ring 10. The arm end 16 is secured to said ring by means of a pin 19; but the other arm end overlaps the two sides of the cut which is made through the ring thereat.

In the arm-section near the end 15 is formed a socket 17, in which loosely plays the pin 30, and to the ends of this pin are pivoted the lever-arms 26, whose arms 25 abut against the ring 10.

The ends 24 of the levers 23 are provided with adjusting-screws 27, resting against plugs 22, slidable in a suitable seat 18 in the lower section of the arm 12. The inner ends of these plugs are rounded and are forcibly pressed apart or permitted to approach each other by means of the wedge-pin 21, projecting from the grooved collar 20, which is longitudinally movable along the shaft 1 by means of any suitable device, as a lever 29.

The lever-arms 25 are each provided with a hardened peg 28 inserted therein and bearing against the friction-ring 10.

The friction-ring is made slightly less in diameter than the flange 4 in order that it will normally refrain from pressure against the latter; but when by forcing the collar 20 toward the arm 12 the plugs 22 are separated and pressure applied thereby to the pegs 28 then the disconnected ends of the friction-ring are forced apart and its diameter so increased as to bear against the rim 4. By suitably varying the pressure applied to the collar 20 the friction-ring 10 can be made to impart to the rim 4 any degree of frictional resistance, and hence any degree of the power applied to the shaft 1 can be transmitted to the sprocket-wheel 2.

The levers 23 being pivoted to the movable pin 30 instead of to the arm 12, any lack of accuracy in the manufacture of the parts or any unequal wear is taken care of by the shifting of the said pin in the arm 12. Further wear on the part of the contacting surfaces of the ring and rim is taken up by means of the adjusting-screws 27.

As is evident, this friction-clutch is easy and economical to manufacture, practically adjusts itself, is durable in use, and very efficient in the transmission of power.

Although I have described this as designed for a friction-clutch, it is very effective when arranged for a brake.

I have shown the member 21 in both Figs. 2 and 3 as a wedge-pointed pin; but it is evident that a conically-pointed pin will serve the purpose equally well of forcibly entering between the pair of plugs 22, and thereby pressing the latter apart.

In addition to the pin 19, securing the friction-ring 10 to the arm 12 at the diametrically opposite point to the cut in said ring I provide a similar pin 19', fixed in the opposite end of said arm and entering notches in the cut ends of the ring. Hence whichever direction the shaft 1 revolves, whether backward or forward, this pin 19' receives the thrust of the ring end, which is forced against the same by the friction between such ring and the rim 4. This causes substantially the entire ring to be forced into frictional engagement with the rim 4, the opening made in the rim for the pin 19 being made sufficiently large to permit the peripheral movement of the ring to be limited by the pin 19' and the pin 19 serving mainly to keep the ring from being dislodged from within the rim. The dotted lines at the sides of the dotted lines indicating the pin 19 in Fig. 1 illustrate such enlargement of said opening.

I also prefer to split the ends 24 of the levers 23 and provide the same with clamping-screws, as shown in Fig. 1, for the purpose of keeping the screws 27 from accidental turning. This being a well-known expedient, however, I do not more fully illustrate it.

What I claim as my invention, and for which I desire Letters Patent, is as follows, to wit:

1. The combination with an annular rim, of a diametrical arm independent of but revoluble concentric with said rim, a divided friction-ring held by said arm within said rim, a pair of levers pivotally held by said arm and engaging said ring, and means for forcing said levers apart and thereby expanding said ring into frictional contact with said rim; the pivots of said arms being rigidly united but loosely held by said arm.

2. The combination with an annular rim, of a diametrical arm independent of but revoluble concentric with said rim, a pin slidably held by said arm with its ends projecting from opposite sides thereof, a lever pivoted to each end of said pin, a divided friction-ring engaged by said levers and in close juxtaposition to the inner surface of said rim, and means for forcing the free ends of said levers apart and thereby expanding said ring into frictional contact with said rim.

3. The combination with an annular rim, of a diametrical arm independent of but revoluble concentric with said rim, a pair of levers pivoted to said arm, a pair of plugs slidably held by said arm and arranged to move said levers when pressed apart, a pointed member constructed to be forcibly introduced between said plugs and thereby press them apart, and a divided friction-ring held by said arm at a point diametrically opposite the cut dividing it; said ring and levers being constructed to expand said ring when said plugs are pressed apart.

4. In combination, a rotating shaft, a power-transmitting device freely mounted on said shaft and having a cylindrical or annular rim rigidly connected therewith, a divided friction-ring within said rim, a diametrical arm fixed on said shaft, a pin loosely held by said arm, a three-armed lever pivoted to each end of said pin, a pair of plugs slidably held by said arm, a pointed pin constructed to be forcibly introduced between said plugs, adjusting-screws turning in the free ends of said levers and abutting against said plugs, and a pin passing through said ring into an end of said arm, one arm of each lever contacting with the interior of said rim and expanding the same when said plugs are forcibly moved apart.

5. The combination with an annular rim, of a diametrical arm independent of but revoluble concentric with said rim, a friction-ring between said arm's extremities and said rim divided at one point, a pin penetrating said ring at said point of division and fixed in an end of said arm, a second pin penetrating said ring at a diametrically opposite point to the first-named pin and fixed in the opposite end of said arm, and means for expanding said ring into contact with said rim.

In testimony that I claim the foregoing invention I have hereunto set my hand this 13th day of July, 1904.

SAMUEL UPTON.

Witnesses:
E. T. TILTON,
A. B. UPHAM.